Sept. 22, 1964 R. E. SWENSON 3,149,652
COLLAPSIBLE HAND SAW
Filed Dec. 11, 1961 2 Sheets-Sheet 1
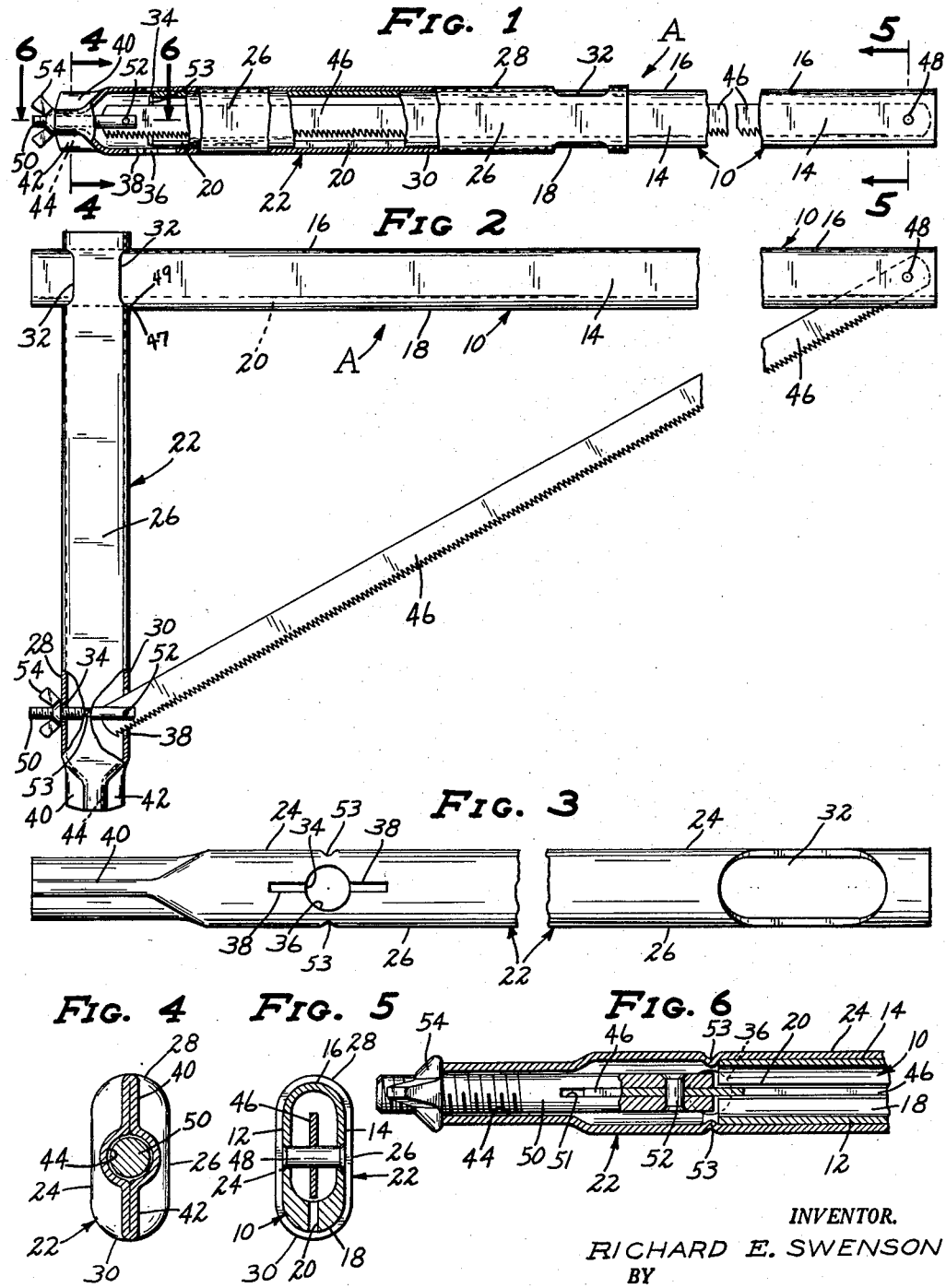
INVENTOR.
RICHARD E. SWENSON
BY
Caswell, Lagaard & Wicks
ATTORNEYS

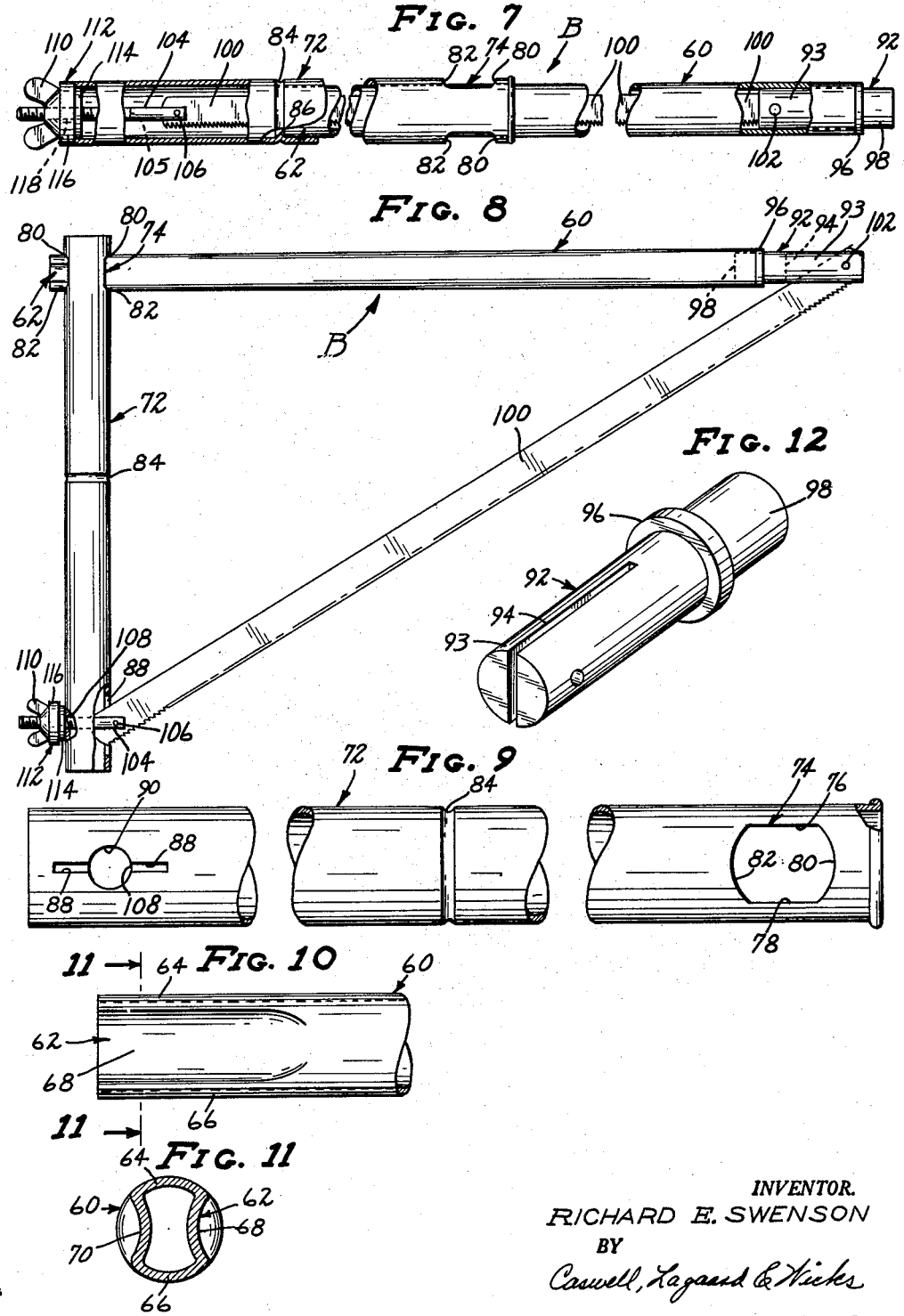

United States Patent Office 3,149,652
Patented Sept. 22, 1964

3,149,652
COLLAPSIBLE HAND SAW
Richard E. Swenson, 5044 London Road, Duluth, Minn.
Filed Dec. 11, 1961, Ser. No. 158,329
8 Claims. (Cl. 145—34)

The invention relates broadly to an improvement in saws and more particularly to a hand saw which may be collapsed.

It is an object of the invention to provide a hand saw which may be easily and simply collapsed. It is also an object of the invention to provide a saw which has an absolute minimum of parts and which is extremely compact when collapsed. It is still another object to provide the above mentioned saw which is also extremely rigid when in operative position. It is a further object to provide a saw which may be collapsed and the blade stored whereby the blade is entirely concealed.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a longitudinal side elevation of my saw in fully collapsed position, portions of which are in section, other portions being broken away.

FIGURE 2 is a side elevational view of the saw in open operative position, portions thereof being broken away.

FIGURE 3 is a side elevational view of the handle, a portion of the same being broken away.

FIGURE 4 is a section on the line 4—4 of FIGURE 1.

FIGURE 5 is a section on the line 5—5 of FIGURE 1.

FIGURE 6 is an enlarged section on the line 6—6 of FIGURE 1.

FIGURE 7 is a longitudinal side elevation of a further embodiment of my saw in fully collapsed position, portions of which are in section, other portions being broken away.

FIGURE 8 is a side elevational view of the saw of FIGURE 7 in open operative position, portions thereof being broken away.

FIGURE 9 is a side elevational view of the handle, portions of the same being broken away.

FIGURE 10 is a side elevational view of a portion of the inner end of the back bar.

FIGURE 11 is a sectional view on the line 11—11 of FIGURE 10.

FIGURE 12 is a perspective view of the blade-holder plug removed from the saw unit.

Referring to the drawings in detail, the saw A includes the elongated hollow back bar 10 formed of the spaced side wall portions 12 and 14, the top portion 16 which connects the upper edges of the side walls 12 and 14 and the bottom portion 18 which connects the lower edges of the side walls 12 and 14. The bottom portion 18 of the bar 10 has formed therein the longitudinally extending slot 20 which extends throughout the length of the portion 18.

A handle 22 is provided which is tubular in formation and has the same general cross sectional formation as the back bar 10 but which is large enough so that the same may be slipped upon the back bar. The handle 22 is formed of the side wall portions 24 and 26 and the upper and lower connecting wall portions 28 and 30, respectively. The handle 22 is formed with the transverse opening 32 at the upper end thereof which snugly receives the bar 10 particularly as illustrated in FIGURE 2. The upper wall portion 28 of the handle 22 is formed with the bolt-receiving hole 34 and the lower wall portion 30 is formed with the bolt-receiving hole 36 and the intersecting slot 38. Further the wall portions of the handle 22 are pressed together at a portion of the lower ends thereof as at 40 and 42 to form the elongated bolt hole 44 which lies on the longitudinal axis of the handle 22.

Further provided is the saw blade 46 which is pivotally secured at the outer end thereof to the outer end of the backbar 10 by means of the pivot pin 48 whereby the blade may be pivotally moved through the slot thereof into the stored position of FIGURE 1 or into the operative position of FIGURE 2.

The inner end of the blade 46 is pivotally connected to the end of the short handle pin 50 within the slot 51 thereof by means of the pivot pin 52. The short pin 50 is positioned in the holes 34 and 36 of the handle 22 with the blade 46 extending into the slot 38 when the saw A is set up in operative position as in FIGURE 2. The pin 50 is threaded at its outer end and is equipped with the wing nut 54.

In using the saw A the handle 22 is made free of the bar 10 and the end of the bar 10 is inserted through the opening 32 of the handle as in FIGURE 2. The blade 46 is placed in substantially the position of FIGURE 2 and the pin 50 is inserted through the hole 34 of the handle 22. The wing nut 54 is then screwed upon the pin 50 thereby drawing up on the blade 46, and as this is done the handle 22 becomes slightly canted, or biased, with relation to the bar 10 at the point where the bar 10 extends through the hole 32 of the handle. Such action securely binds the handle upon the bar 10 which is simultaneous with the tightening or drawing up on the blade 46 and as a result the saw is a rigid unit ready for use. To positively position the handle 22, the bar 10 is formed with a shoulder 47 against which the shoulder 49 of recess 32 abuts.

In collapsing the saw, the wing nut 54 is removed and the pin 50 removed from the hole 34 and the hole 36 of the handle 22. The end of the bar 10 is removed from the hole 32 of the handle 22. The blade 46 is pivoted upwardly into the slot 20, the pin 50 extending beyond the bar 10 to the position of FIGURE 1.

The handle 22 is slipped onto the back bar 10 with the pin 50 extended through the hole 44 of the lower end of the handle. The inner end of the bar 10 abuts a shoulder 53 formed in the handle 22. The wing nut 54 is then tightened upon the pin 50, and the handle 22 is thereby drawn tightly upon the bar 10 holding the parts firmly together in the least possible space as illustrated best in FIGURE 1. It will be noted that the blade 46 is entirely concealed whereby the teeth of the same can do no damage.

Referring to FIGURES 7–11 which disclose a further embodiment B of the invention, the numeral 60 designates a hollow back bar which is cylindrical in formation. The back bar 60 has formed on the inner end thereof the swedged portion 62 formed of the arcuate ends 64 and 66 and concave portions 68 and 70 which gives the end of the bar a rough rectangular cross section. Further provided is the hollow handle 72 which is cylindrical in formation and of an inside diameter to receive a part of the back bar as illustrated in FIGURE 7. The handle 72 is formed with transverse opening 74 formed with the parallel sides 76 and 78 and the arcuate ends 80 and 82 which receives the swedged bar end 62. The handle 72 is also formed with the annular indent 84 which forms the internal shoulder 86. The numeral 88 designates a slot formed in the wall of the handle 64 and centrally thereof the hole 90.

Further provided is the cylindrical blade-holder plug 92 which is formed with the slot 94 at one end portion 93 thereof and the annular shoulder 96 adjacent the opposite end portion 98 thereof. The blade 100 is pivotally connected to the end portion 93 of the plug 92 within the slot 94 by means of the pin 102. Pivotally connected to the opposite end of the blade 100 is the pin 104 which is slotted as at 105 to receive the blade, and the pivotal connection is made by means of the small pin 106 with the blade within the slot 105. The handle 64 is also formed with the hole 108 which is directly opposite the hole 90 and the holes 90 and 108 mount the pin 104. The pin 104 is threaded at its outer end and is equipped with a wing nut 110.

Also provided is the circular plug cap member 112 formed of the minor circular portion 114 and the major or larger diameter portion 116 which is formed with an axial hole 118 extending therethrough and through which the pin 104 extends.

In using the saw B let it be assumed that the saw is in the fully collapsed condition of FIGURE 7. The nut 110 is removed and the plug 92 together with the blade 100 and pin 104 are pulled from the hollow backbar 60. The plug 92 is pivotally reversed, and the end portion 98 is inserted into the outer end of the back bar 60 as in FIGURE 8. The swedged inner end 62 of the bar 60 is inserted in the opening 74 of the handle 72. The pin 104 of the inner end of the blade 100 is inserted through the holes 90 and 108 with the end of the blade in the slot 88. The nut 110 and cap 112 are then placed on the outer end of the pin 104 and the nut tightened thereby drawing up the blade 100 into a rigid position whereby the saw is ready for use. To collapse the saw B, the nut 110 and cap 112 are removed, the pin 104 removed from the holes 108 and 90 and the plug 92 reversed. The end portion 93 of plug 92 is then inserted in the outer end of the hollow bar 60 with the blade 100 extending into the bar. The bar 60 is then slipped into the handle 72 until the inner end abuts the shoulder 86, and in this position the pin 104 extends outwardly of the lower end of the handle 72. The minor end 114 of the plug 112 is inserted into the end of the handle with the major end 116 abutting the end of the handle 72. The nut 110 is then tightened and the saw B is then compactly and rigidly held in the collapsed position of FIGURE 7. In this condition the saw B presents the minimum possible area and the saw edge of the blade is concealed so that it can do no damage. It will also be seen that the number of pieces is at a bare minimum and that due to the cylindrical nature of the bar 60 and handle 72, regular open stock tubing may be used which cut down manufacturing costs.

The invention is not to be understood as restricted to the details set forth since these may be modified within the scope of the appended claims without departing from the spirit of the invention.

Having thus described the invention, what is claimed as new and desired to be secured by Letters Patent is:

1. In a collapsible saw, an elongated hollow back bar having a slot formed therein and extending throughout the length thereof, a saw blade pivotally connected at its outer end to the outer end of said back bar and adapted to be pivotally moved into and out of said hollow back bar through said slot, a hollow handle having an opening formed transversely therethrough adjacent the upper end thereof and through which said back bar is adapted to extend, said hollow handle having an inside diameter greater than the outside diameter of said back bar, and means for securing and drawing up the inner end of said saw blade upon the lower end of said handle whereby the upper end of the handle is biased to grippingly engage said back bar and rigidly position said saw blade on said back bar and handle.

2. In a collapsible saw, a rectilinear elongated back bar, a saw blade pivotally connected at its outer end to the outer end of said back bar, a handle having an opening extending transversely therethrough, said opening being slightly greater in area than the cross-sectional area of said back bar and through which said back bar is adapted to extend, and means for securing and drawing up the inner end of said saw blade upon the lower end of said handle whereby the upper end of the handle is biased to grippingly engage said back bar and rigidly position said saw blade on said back bar and handle.

3. In a collapsible saw, an elongated hollow back bar having a slot formed therein and extending throughout the length thereof, a saw blade pivotally connected at its outer end to the outer end of said back bar and adapted to be pivotally moved into and out of said hollow back bar through said slot, a hollow handle having an opening formed transversely therethrough adjacent the upper end thereof and through which said back bar is adapted to extend, said hollow handle having an inside diameter greater than the outside diameter of said back bar, a threaded pin pivotally connected to the inner end of said saw blade, the lower end of said handle having a pin opening formed transversely therein and adapted to receive said pin, and screw means for drawing up said pin and saw blade upon said handle whereby the upper end of said handle is biased to grippingly engage said back bar and rigidly position said saw blade on said back bar and handle.

4. In a collapsible saw, a hollow back bar, a plug member having its inner end removably positioned in the outer end of said back bar axially thereof and the outer end of said plug extending therefrom, said outer end of said plug receivable in the outer end of said back bar, a saw blade pivotally connected at its outer end to the outer free end of said plug, the major cross-sectional dimension of said blade being less than the inside diameter of said back bar to allow positioning of the blade thereinto with the outer end of said plug positioned in the outer end of said back bar a hollow handle having an opening formed transversely therethrough adjacent the upper end thereof and through which said back bar is adapted to extend, said handle having an inside diameter slightly greater than the outside diameter of the back bar to allow said handle to slidably fit upon said back bar and means for securing and drawing up the inner end of said saw blade upon the lower end of said handle whereby the upper end of the handle is biased to grippingly engage said back bar and rigidly position said saw blade on said back bar and handle.

5. In a collapsible saw, an elongated hollow cylindrical back bar, a plug member removably engageable in the outer end of and axially of said back bar, a saw blade pivotally connected at its outer end to the outer end of said plug member with the inner end of said plug engaged in the outer end of said back bar, the major cross-sectional dimension of said blade being less than the inside diameter of said back bar to allow positioning of the blade thereinto, a hollow cylindrical handle having an opening formed transversely therethrough adjacent the upper end thereof and through which said back bar is adapted to extend, said handle having an inside diameter slightly greater than the outside diameter of said back bar to allow said handle to be slidably positioned on said back bar, and means for securing and drawing up the inner end of said saw blade upon the lower end of said handle to rigidly position said saw blade on said back bar and said handle.

6. In a collapsible saw, an elongated hollow cylindrical back bar, a plug member removably engageable in the outer end of said back bar axially thereof, a saw blade pivotally connected at its outer end to the outer end of said plug member with the inner end of said plug removably engaged in the outer end of said back bar, said blade having a width less than the inner diameter of said cylindrical back bar, a hollow cylindrical handle having an opening formed transversely therethrough adjacent the upper end thereof, said handle having an inside diameter slightly greater than the outside diameter of said back bar to allow said handle to be slidably positioned on said back bar, the inner end of said back bar being formed with a cross section adapted to fit into said opening of said handle, pin means secured to the outer end of said blade for securing and drawing up the inner end of said saw blade upon the lower end of said handle whereby the upper end of the handle is biased to grippingly engage said back bar and rigidly position said saw blade ond said back bar and handle said handle having shoulder means formed internally thereof adapted to engage the inner end of said back bar to position the bar therein, and means for securing said pin means to the upper end of said handle to secure said blade and back bar within said handle.

7. The device of claim 3 wherein said handle includes shoulder means formed internally thereof adapted to engage the inner end of said back bar with said pin extended from said handle, said handle secured upon said back bar with said screw means engaging said pin and said handle.

8. The device of claim 1 further characterized by means for securing said handle coaxially upon said back bar.

References Cited in the file of this patent

UNITED STATES PATENTS

| | | |
|---|---|---|
| 2,332,545 | Acomb | Oct. 26, 1943 |
| 2,595,288 | Peters | May 6, 1952 |
| 2,612,196 | Bouschor | Sept. 30, 1952 |
| 2,645,261 | Swanstrom | July 14, 1953 |
| 2,781,806 | Wilson | Feb. 19, 1957 |
| 2,849,040 | Tideman | Aug. 26, 1958 |
| 2,912,025 | Thomas | Nov. 10, 1959 |

FOREIGN PATENTS

| | | |
|---|---|---|
| 454,047 | Germany | Dec. 27, 1927 |